Jan. 27, 1953     E. V. HARLOW     2,626,679
DIFFUSION PROCESS
Filed June 15, 1949     2 SHEETS—SHEET 1
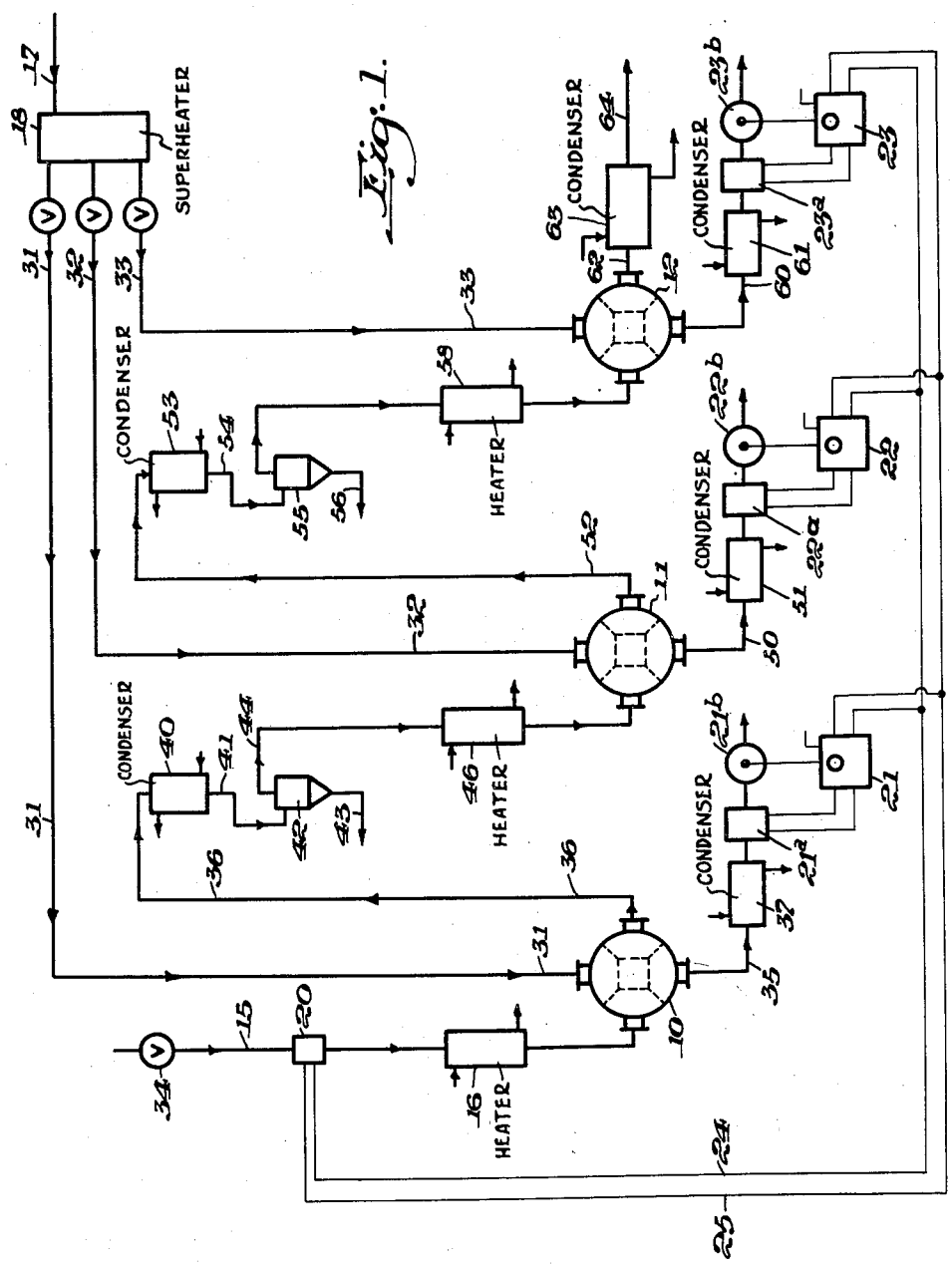
INVENTOR.
EARL V. HARLOW.
BY Arthur L. Jerome
his ATTORNEY.

Jan. 27, 1953 E. V. HARLOW 2,626,679
DIFFUSION PROCESS
Filed June 15, 1949 2 SHEETS—SHEET 2
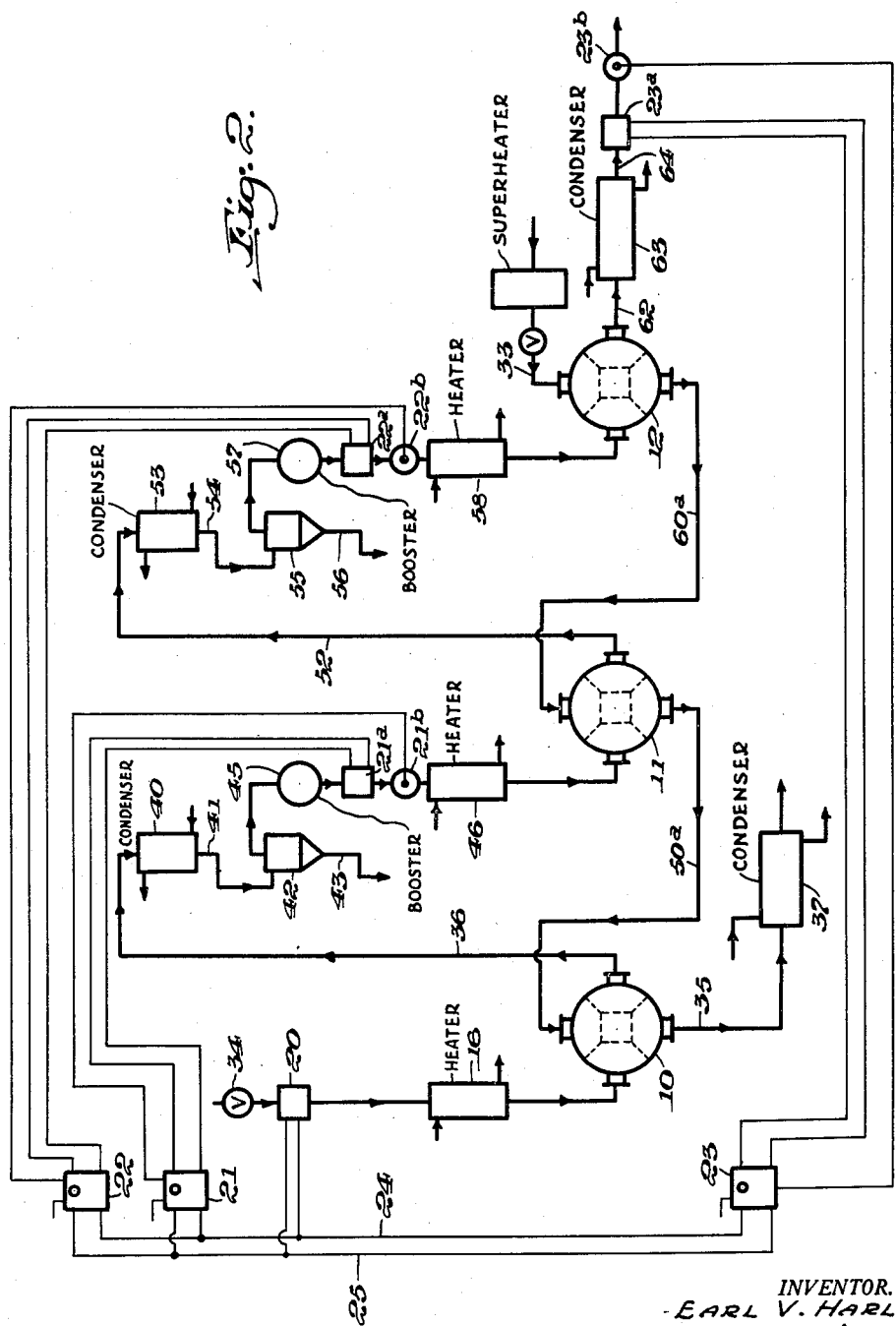
INVENTOR.
EARL V. HARLOW.
BY Arthur L. Jerome
his ATTORNEY.

Patented Jan. 27, 1953

2,626,679

UNITED STATES PATENT OFFICE 2,626,679

DIFFUSION PROCESS

Earl V. Harlow, Beaver, Pa., assignor to Koppers Company, Inc., a corporation of Delaware Application June 15, 1949, Serial No. 99,246

8 Claims. (Cl. 183—115)

This invention relates to the separation and concentration of gases by diffusion and particularly to an improved process which makes it possible to secure the maximum efficiency of extraction of a selected component from a feed gas consisting of a gaseous mixture.

In the separation or concentration of a gas by diffusion, the feed gas is passed along one side of a porous diaphragm or boundary and a gaseous sweep medium is passed along the opposite side of the boundary. The constituent being separated from the feed gas passes through the boundary and the sweep gas acts to sweep the constituent away from the boundary. In addition, as the sweep gas passes across the face of the boundary, some of the sweep medium diffuses through the boundary to the feed gas side of the boundary.

The effective separation of the selected component from the feed gas not only decreases as the concentration of this component in the feed gas decreases, but it further decreases as the concentration of this component in the sweep medium increases. Accordingly, the rate of separation of the selected component from the feed gas gradually decreases because of the gradual reduction in the difference in concentration of this component on opposite sides of the boundary, and this reduction in the difference in the concentration of this component on opposite sides of the boundary is caused in part by the dilution of the feed gas by the sweep medium passing through the boundary. This reduction in the difference between the relative proportions of the selected component in the feed gas and in the sweep medium makes it difficult to separate additional amounts of this component from the feed gas. Accordingly, it has been difficult to secure relatively complete separation of a component from a gaseous mixture by the diffusion process.

An object of this invention is to provide an improved diffusion process which makes it possible to secure a much more complete separation of a selected component from a gaseous mixture than has been practical heretofore.

A further object of this invention is to provide an improved diffusion process which makes most efficient use of the apparatus employed.

Another object of this invention is to provide an improved diffusion process which is carried out in a plurality of different stages and incorporates means for removing the sweep medium from the feed gas between successive stages to thereby increase the relative concentration of the selected component in the feed gas so that a high degree of extraction of the selected component may be secured and so that a relatively high concentration gradient is maintained between the gases on opposite sides of the diffusion boundaries at all stages in the process with the result that the process is carried out with a maximum degree of efficiency.

A further object of the invention is to provide an improved multiple stage diffusion process which incorporates between each of the successive stages means for condensing sweep medium from the feed gas and for reheating the feed gas to thereby eliminate the possibility that the sweep medium will condense on a porous boundary and prevent diffusion of gases through substantial areas of a boundary with consequent reduction in the capacity of the unit in which the boundary is located.

Other objects of the invention and features of novelty will be apparent from the following description taken in connection with the accompanying drawings in which, Fig. 1 is a diagrammatic flow sheet illustrating one embodiment of the invention, and Fig. 2 is a diagrammatic flow sheet illustrating a modification which I may employ.

The method of this invention is directed to the separation and concentration of the lightest constituent of a gaseous mixture. For example, the method of this invention is adapted to the separation of hydrogen from fuel gases, such as coke-oven gas, or from the gases produced in oil refineries or from the cracking of petroleum, but is not restricted to this use. The hydrogen content of coke-oven gas may vary from 50% to 60%, while the hydrogen content of oil refinery or cracking still gases may vary from 20% to 80%.

It is sometimes desirable to secure hydrogen gas of substantially greater purity than that present in an available gaseous mixture. In addition, it is sometimes desirable to extract from an available feed gas a relatively large proportion of the hydrogen present in such gaseous mixture. The method of this invention makes it possible to accomplish these objects.

Hydrogen is a relatively light gas and therefore has a relatively high rate of diffusion through a porous diaphragm or boundary. Hence, the concentration of hydrogen on the sweep medium side of a boundary increases rapidly. At the same time, because of the rapid extraction of hydrogen from the feed gas there is a rapid decrease in the hydrogen content of the feed gas.

Where steam is used as the sweep medium, the steam diffuses through the boundary much less rapidly than the hydrogen because the steam has a much greater molecular weight than the hydrogen. However, a substantial quantity of steam diffuses through the boundary and mixes with the feed gas to thereby dilute the feed gas and thus reduce the concentration of hydrogen in the gas on the feed gas side of the boundary.

As a result of the increase in the concentration of hydrogen on the sweep medium side of the boundary and the decrease in the concentration of hydrogen on the feed gas side of the boundary, there is a substantial reduction in the hydrogen concentration gradient between the two sides of the boundary with a resultant reduction on the effective rate of diffusion of hydrogen from the feed gas.

In the method provided by this invention the feed gas is passed through a series of diffusion units in each of which some of the hydrogen is extracted from the feed gas. The residual feed gas discharged from each diffusion unit is passed through a cooler to condense the steam present therein and thus increase the percentage of hydrogen present in this feed gas before the gas is supplied to the succeeding diffusion unit. Hence, the maximum hydrogen concentration gradient is maintained in each unit and each unit operates at maximum efficiency.

In addition, in the method provided by this invention the residual feed gas from each diffusion unit, except the last unit in the series, after having the steam condensed therefrom, is heated so that on the supply of this gas to the succeeding diffusion unit, the gas will not cause condensation of the steam in that diffusion unit with consequent blocking of portions of the boundary in that unit.

Referring to Fig. 1 of the drawings the equipment shown therein includes a plurality of diffusion units which are designated 10, 11, and 12. This invention is not concerned with the details of construction of the diffusion units. These units may be constructed as shown in my application, Ser. No. 75,954, filed February 11, 1949, for Diffusion Apparatus. It is sufficient to state that each of the diffusion units incorporates two sets of passages which are separated by walls formed of foraminous material, such as screen or perforated metal, and that the feed gas flows through one set of passages while the sweep gas flows through the other set of passages. The diffusion units are arranged so that the feed gas flows horizontally through each of the units and so that the sweep gas flows vertically through each of the units.

Feed gas, which may be coke-oven gas, is supplied through a line 15 to a heater 16 where it is heated to the temperature of the steam which is supplied to the diffusion unit 10. The heater 16, as well as the other heaters employed in this system, is of the indirect type, and may be supplied with a suitable heating medium, such as steam, from any appropriate source, not shown. From the heater 16 the feed gas is supplied to the diffusion unit 10 and flows horizontally through this unit from left to right.

The equipment shown in Fig. 1 of the drawings includes flow control apparatus for regulating the rate of flow of gas discharged from the various diffusion units so that the volume of gas discharged from each of the diffusion units is a predetermined proportion of the feed gas initially supplied to the process.

The details of construction and operation of the flow control apparatus are not a part of this invention and this apparatus may be of any appropriate design and construction which is commercially available.

The equipment shown includes an orifice unit 20 for measuring the volume of feed gas supplied through the line 15 to the diffusion unit 10, while ratio flow controllers in the form of regulating units 21, 22, and 23 are connected in multiple with the unit 20 by pressure ducts 24 and 25.

The regulating unit 21 is connected by a pair of tubes with an orifice unit 21a located in the pipe through which sweep gas flows from the diffusion unit 10. The regulating unit 21, therefore, is provided with information as to the rate of flow of gas through two pipes and it operates to govern a valve 21b to maintain the rate of flow of gas through the pipe 35 leading from the diffusion unit 10 at a fixed, predetermined proportion of the rate of flow of gas through the supply pipe 15. It is contemplated that the valve 21b will be a diaphragm operated valve, that will respond to air under pressure supplied to a chamber at one face of the diaphragm, and that the regulating unit 21 controls the supply of air to this chamber from a suitable source of air under pressure, not shown.

In like manner, the regulating units 22 and 23 are connected with orifice units 22a and 23a, respectively, and control valves 22b and 23b.

For purposes of illustration it will be assumed that regulating unit 21 is adjusted so that the flow of gas through the orifice unit 21a is maintained at a rate three tenths (0.3) as great at that through the orifice unit 20; and that the units 22 and 23 are adjusted so that the rate of flow of gas through the orifice units 22a and 23a is two tenths (0.2) and one tenth (0.1), as great, respectively, as through the orifice unit 20. The invention is not limited to these specific values, and it is contemplated that they may be varied as conditions require.

The steam which is employed as a sweep medium in the diffusion units is supplied from a suitable source through the pipe 17 to a superheater 18 where the temperature of the steam is increased to reduce the possibility of condensation of the steam in the diffusion units. From the superheater 18 the steam is supplied through steam supply pipes 31, 32, and 33 to the diffusion units and flows downwardly through each of these units.

It is to be understood that the pressure of the steam supplied to the pipe 17 is accurately regulated by means not shown, so that steam under substantially constant pressure is supplied through the superheater 18 to the steam supply pipes 31, 32, and 33.

Each of the steam supply pipes has associated therewith a control valve $v$ which controls the rate of flow of steam through the associated pipe. The control valves $v$ may be manually regulated, or may be automatic flow controllers.

The volume of gas flowing through the pipe 15 to the heater 16 and thus to the diffusion unit 10 is governed by an accurately regulated flow control valve 34 so that the flow of the feed gas supplied to this unit is maintained substantially constant.

In passing through the diffusion unit 10 some of the hydrogen present in the feed gas diffuses through the boundaries to the sweep gas and passes from the diffusion unit with the sweep gas which is discharged through the pipe 35. Similarly, in passing through the diffusion unit 10 some of the steam employed as a sweep gas diffuses through the boundaries to the feed gas and passes from the unit with the residual feed gas which is discharged from the unit through the pipe 36.

The gas discharged from the diffusion unit 10 through the pipe 35 passes through the condenser 37 where the gas is cooled so as to condense the steam present therein, leaving a concentrate having a high percentage of hydrogen. The condensate from this condenser is discharged to a drain through a suitable pipe, not shown. The condenser 37, as well as the other condensers employed in this system, may be of the indirect type and may be supplied with cooling water from a suitable source, not shown.

The gas discharged from the condenser 37 flows through the orifice 21a, and then through the valve 21b, from which the gas may be supplied to any suitable receptacle, not shown, for further use. As the steam is removed from the gas before the gas flows through the orifice unit 21a, the gas measured by this orifice unit is the hydrogen concentrate. As explained above the regulating unit 21 controls the valve 21b to cause the rate of flow of gas through this valve to be equal to three tenths the rate of flow of feed gas through the pipe 15 leading to the diffusion unit 10. Hence, the diffusion unit 10 is regulated to extract from the feed gas concentrate equal in volume to three tenths of the feed gas. The remainder of the feed gas is discharged from the diffusion unit 10 through the pipe 36 and is supplied to the diffusion units 11 and 12 for further extraction of hydrogen concentrate therefrom as hereinafter described.

The feed gas supplied to the diffusion unit 10 contains a relatively high percentage of hydrogen, while the steam supplied to this unit is free of hydrogen. As the feed gas passes through the unit 10, the concentration of hydrogen therein decreases by separation of hydrogen from the feed gas and by dilution of the feed gas because of addition of steam thereto. As the steam or sweep gas flows through the diffusion unit 10, the concentration of hydrogen therein increases by diffusion of hydrogen thereto from the feed gas. Hence, as the feed and sweep gases pass through the diffusion unit, the hydrogen concentration gradient between the two gases decreases, but the arrangement of apparatus is such that there is a substantial difference in the hydrogen concentration of the two gases in the unit 10 so that there is substantial separation of hydrogen from the feed gas in this unit.

The residual feed gas, together with steam present therein, is discharged from the diffusion unit 10 through the pipe 36 and is supplied to the condenser 40 where the steam present in the gas is condensed and removed. From the condenser 40 the gas flows through pipe 41 to the centrifugal separator 42 which removes moisture entrained in the gas. The moisture removed in the separator 42 is discharged through the drain pipe 43, while the gas leaves the separator 42 through he pipe 44 and flows through a heater 46 where the temperature of the gas is raised above the dew point of steam. From the heater 46 the gas is supplied to the diffusion unit 11.

As the steam present in the residual feed gas discharged from the first diffusion unit 10 is removed from this gas before the gas is supplied to the second diffusion unit 11, the hydrogen concentration gradient between the feed and sweep gases in the diffusion unit 11 is at the maximum value and the second diffusion unit operates at maximum efficiency to separate hydrogen from the feed gas.

As the feed gas passes through the second diffusion unit 11, hydrogen from the feed gas diffuses into the sweep steam and passes with the sweep steam from the diffusion unit through the pipe 50 which leads to the condenser 51 where the steam is condensed, leaving the hydrogen concentrate.

As the feed gas passes through the diffusion unit 11, some steam diffuses to the feed gas and is discharged from the diffusion unit with the residual feed gas through the pipe 52.

The pipe leading from the condenser 51 is governed by valve 22b, which is governed by the regulating device 22 in such manner as to limit the rate of flow of gas through this pipe, to thereby regulate the amount of hydrogen separated from the feed gas in the diffusion unit 11. As previously explained, the valve 22b is controlled so that the hydrogen concentrate removed in the diffusion unit 11 is equal to two tenths of the volume of the feed gas supplied through the pipe 15.

The residual feed gas from the diffusion unit 11, together with steam present therein, flows through pipe 52 to the condenser 53 where the steam present in the gas is condensed and extracted. The gas flows from the condenser 53 through pipe 54 to the centrifugal separator 55 which removes entrained moisture from the gas and from which moisture drains through the pipe 56. From the separator 55 the gas flows through the pipe 56 to the heater 58 where the temperature of the gas is raised above the dew point of steam and from which the gas is supplied to the diffusion unit 12.

As the steam present in the residual feed gas discharged from the second diffusion unit 11 is removed from the gas before the gas is supplied to the third diffusion unit 12, the hydrogen concentration gradient between the feed and sweep gases in the diffusion unit 12 is at the maximum value and this unit operates at maximum efficiency to separate hydrogen from the feed gas. The relatively high hydrogen concentration gradient between the feed and sweep gases in the diffusion unit 12 makes it possible to reduce the hydrogen content of the feed gas to a relatively low level, thus effecting relatively complete removal of hydrogen from the feed gas.

As the feed gas passes through the diffusion unit 12, hydrogen from the feed gas diffuses into the sweep steam and passes with the sweep steam from the diffusion unit through the pipe 60 which leads to the condenser 61 where the steam is condensed, leaving the hydrogen concentrate.

As the feed gas passes through the diffusion unit 12, some steam diffuses into the feed gas and is discharged from the diffusion unit with the residual feed gas through the pipe 62 which leads to a condenser 63 where the steam present in the gas is condensed. The remaining gas, from which substantially all, or at least a large proportion, of the hydrogen has been removed, is discharged through the pipe 64 and may be employed for any appropriate purpose.

The pipe leading from the condenser 61 is governed by valve 23b which is governed by the regulating device 23, so as to restrict the rate of flow of gas through this pipe and thereby regulate the amount of separation of hydrogen from the feed gas in the diffusion unit 12. As previously explained, the valve 23b is controlled so that the hydrogen concentrate removed in the diffusion unit 12 is equal to one tenth of the volume of the feed gas supplied through the pipe 15.

In the modification illustrated in Fig. 1, sweep steam is supplied from the source to each of the diffusion units in multiple. However, it is contemplated that the steam may be supplied through the diffusion units in series, the steam flowing countercurrent to the flow of feed gas through these units, and Fig. 2 shows this modification. Except as hereinafter particularly pointed out in detail, the construction and operation of the equipment shown in Fig. 2 is the same as that shown in Fig. 1, and similar reference numerals are employed in Figs. 1 and 2 to designate the elements which are similar.

Referring to Fig. 2 of the drawings, the equipment therein illustrated includes three diffusion units designated 10, 11, and 12, through which the feed gas flows in series in order named. In this species the steam from the superheater 18 is supplied through pipe 33 to the diffusion unit 12, while the sweep steam discharged from the unit 12, together with the hydrogen or other gaseous component added thereto from the feed gas by diffusion, is supplied through pipe 60a to the diffusion unit 11. Similarly, the sweep steam discharged from the unit 11 is supplied through the pipe 50a to the unit 10, while the steam discharged from the unit 10 is supplied through pipe 35 to the condenser 37 where the steam is condensed, leaving the hydrogen concentrate which has been separated by diffusion from the feed gas in all three of the diffusion units.

As the steam flows through successive diffusion units, there is a slight decrease in the pressure of the steam. Similarly, as the feed gas flows through successive units its pressure decreases slightly. Hence, a booster 45 is provided between the units 10 and 11 and a booster 57 is provided between the units 11 and 12 to increase the pressure of the feed gas supplied to the units 11 and 12. The boosters or compressors 45 and 57 may be regulated in any suitable manner by means not shown so that the pressure of the gas discharged thereby is substantially the same as that of the steam supplied to the diffusion unit to which the gas is supplied.

The discharge of residual feed gas from the various diffusion units is governed by flow regulating valves so that the rate of flow of gas at these points bears a fixed, predetermined relation to the rate of flow of feed gas through the pipe 15.

The rate of flow of residual feed gas discharged from the first diffusion unit 10 is governed by the valve 21b which is controlled by the regulating device 21. This device is controlled in part by the orifice unit 21a which measures the residual feed gas discharged from the diffusion unit 10 after removal of sweep steam from this gas. Hence, the regulating unit 21 operates to accurately regulate the rate of flow of residual feed gas from the diffusion unit 10 with respect to the rate of flow of feed gas to this unit.

Similarly, the flow of residual feed gas from the diffusion unit 11 is governed by valve 22b which is controlled by the regulating device 22, while the flow of residual feed gas from the third diffusion unit 12 is governed by the regulating device 23.

The regulating device 21 is adjusted so that the residual feed gas discharged from the diffusion unit 10 is equal to eight tenths (0.8) of the feed gas supplied through the pipe 15, while the regulating device 22 is adjusted so that the residual feed gas discharged from the diffusion unit 11 is equal to six tenths (0.6) of the feed gas supplied through the pipe 15. Similarly the regulating device 23 is adjusted so that the feed gas discharged from the diffusion unit 12 is equal to four tenths (0.4) of the feed gas supplied through the pipe 15. Accordingly, the hydrogen extracted from the feed gas in each of the diffusion units is equal to approximately two tenths (0.2) of the feed gas supplied through the pipe 15. As a result, the sweep steam discharged from the diffusion unit 10 has mixed therewith hydrogen concentrate equal to six tenths of the feed gas. The foregoing values are given for purposes of illustration; and it is to be understood that the equipment may be adjusted somewhat differently as operating conditions require.

In this modification, as in the species shown in Fig. 1, the steam is removed from the residual feed gas discharged from each diffusion unit before this feed gas is supplied to the next diffusion unit in the series. Similarly, the feed gas is heated before being supplied to a diffusion unit so that condensation of steam within the diffusion units is prevented.

In the modification shown in Fig. 2 the sweep steam supplied to the last diffusion unit in the series, that is, the diffusion unit 12, contains no hydrogen or other gaseous constituent so there is a substantial concentration gradient between the sweep medium and the feed gas in this diffusion unit even though the amount of the lightest gaseous component in the feed gas has been reduced by passage of the feed gas through the preceding diffusion stages. Hence, this unit operates at high efficiency and is effective to separate hydrogen from the feed gas until the hydrogen in the feed gas is reduced to a relatively low level.

The sweep medium supplied to the intermediate diffusion unit 11 has some hydrogen or other gaseous component present therein, but only in relatively low concentration, so there is a substantial concentration gradient with respect to this component between the feed and sweep gases in the unit 11, particularly, as the proportion of this component in the feed gas supplied to the unit 11 has been reduced only by passage of the gas through one diffusion stage.

In like manner the sweep steam supplied to the initial diffusion unit 10, having passed through two diffusion units before being supplied to the unit 10, has a substantial percentage of hydrogen or other light gas component present therein. However, the feed gas supplied to the unit 10, being supplied directly from the source, has a relatively high percentage of hydrogen or other light gas component present therein. Hence, there is a substantial concentration gradient between the sweep and feed gases in the unit 10 with respect to this component and the unit 10 is effective to separate this component from the feed gas at a substantial rate.

In the species shown in Fig. 2, as in the species shown in Fig. 1, the steam is removed from the feed gas before the feed gas is supplied to the second and third diffusion units in the series. Accordingly, the concentration of hydrogen or other light gas component in the feed gas supplied to each diffusion unit is at the maximum value and each unit has a high efficiency in separating this component from the feed gas.

In the modification shown in Fig. 2 the steam is employed successively in a plurality of different diffusion units so the consumption of steam is reduced to the minimum.

From the foregoing, it will be seen that this process separates the lightest constituent of a gaseous mixture by diffusion in a plurality of successive stages. In addition, it will be seen that between successive stages the steam is removed from the feed gas so that the concentration of the lightest component of the feed gas is at the maximum level in each of the diffusion units. Accordingly, the concentration gradient of this component between the feed and sweep gases is at the maximum value and the diffusion units operate at maximum efficiency to separate this component from the feed gas, and also operate to separate this component from the feed gas until the amount of this component in the feed gas is reduced to a low level.

In addition, the feed gas is heated above the dew or condensation temperature of the sweep steam before being supplied to a diffusion unit, thereby eliminating the possibility that steam will condense within the diffusion units and close the apertures in the diffusion boundaries with resultant reduction in the effective area of these boundaries.

Although three stages of diffusion are employed in the process illustrated and described, it should be understood that a larger or a smaller number of stages may be employed.

Although I have illustrated and described two modifications of the diffusion process provided by my invention, it is to be understood that the invention is not limited to these modifications and that changes may be made therein within the spirit and scope of the following claims.

Having thus described my invention, what I claim is:

1. In a process wherein a feed gas flows past a face of a foraminous boundary within a separation zone and a relatively non-condensible component of said feed gas preferentially diffuses through said foraminous boundary and wherein the opposite face of said boundary is swept by an inert relatively condensible sweep gas, a portion of which diffuses into the feed gas, said feed gas and said sweep gas being at a temperature above the condensation point of the latter, the steps which comprise condensing sweep gas from an effluent gas discharged from the separation zone by reducing its temperature by indirect heat exchange to below the condensation point of the sweep gas, measuring the ratio of the flows of fresh feed gas and said effluent gas from the sepaartion zone substantially free of sweep gas, and controlling the flow of said effluent gas at a fixed proportion of the flow of fresh feed gas to the separation zone in response to said ratio of flows.

2. The steps of claim 1 characterized in that said effluent gas is a mixture of sweep gas and the diffused component of the feed gas.

3. The steps of claim 1 characterized in that said effluent gas is residual feed gas.

4. The steps of claim 3 characterized in that the residual feed gas, after being substantially freed of sweep gas, is heated above the condensation point of the sweep gas, and is fed to a second separation zone having a foraminous boundary swept by relatively condensible sweep gas so as to effect separation of additional quantities of said component from the residual gas.

5. In a process wherein a feed gas flows past a face of a foraminous boundary within a separation zone and a relatively non-condensible component of said feed gas preferentially diffuses through said foraminous boundary and wherein the opposite face of said boundary is swept by an inert relatively condensible sweep gas, a portion of which diffuses into the feed gas, said feed gas and said sweep gas being at a temperature above the condensation point of the latter, the steps which comprise condensing sweep gas from the residual feed gas discharged from the separation zone by reducing its temperature by indirect heat exchange to below the condensation point of the sweep gas, controlling the flow of an effluent gas from the separation zone at a fixed proportion of the flow of fresh feed gas to the sepaartion zone in response to the ratio of the flows of fresh feed gas and an effluent gas from the separation zone substantially free of sweep gas, heating said residual gas to a temperature above the condensation point of the sweep gas, flowing the heated res- -idual gas through a second sepaartion zone having a foraminous boundary swept by inert relatively condensible sweep gas and thus effecting separation of additional quantities of said component from said residual gas.

6. In a process wherein a feed gas flows past a face of a foraminous boundary within a separation zone and a relatively non-condensible component of said feed gas preferentially diffuses through said foraminous boundary and wherein the opposite face of said boundary is swept by an inert relatively condensible sweep gas, a portion of which diffuses into the feed gas, said feed gas and said sweep gas being at a temperature above the condensation point of the latter, the steps which comprise condensing sweep gas from the residual feed gas discharged from the separation zone by reducing its temperature by indirect heat exchange to below the condensation point of the sweep gas, measuring the ratio of the flows of fresh feed gas and an effluent gas from the separation zone substantially free of sweep gas, controlling the flow of said effluent gas from the separation zone at a fixed proportion of the flow of fresh feed gas to the separation zone in response to said ratio of flows, heating said residual gas to a temperature above the condensation point of the sweep gas, flowing the heated residual gas through a second separation zone having a foraminous boundary swept by inert relatively condensible sweep gas and thus effecting separation of additional quantities of said component from said residual gas.

7. In a process wherein a feed gas flows past a face of a foraminous boundary within a separation zone and a relatively non-condensible component of said feed gas preferentially diffuses through said foraminous boundary and wherein the opposite face of said boundary is swept by an inert relatively condensible sweep gas, a portion of which diffuses into the feed gas, said feed gas and said sweep gas being at a temperature above the condensation point of the latter, the steps which comprise condensing the sweep gas from the effluent mixture of sweep gas and diffused component of the feed gas discharged from the separation zone by cooling it below the condensation point of the sweep gas so as to produce a stream of diffused component of the feed gas substantially free of sweep gas, measuring the ratio of the flows of fresh feed gas and said diffused component substantially free of sweep gas, controlling the flow of said stream of diffused component of the feed gas at a fixed proportion of the flow of fresh feed gas to the separation zone in response to said ratio of flows, condensing sweep gas from the residual feed gas discharged from the separation zone by reducing its temperature to below the condensation point of the sweep gas, heating said residual gas to a temperature above the condensation point of the sweep gas, flowing the heated residual gas through a second separation zone having a foraminous boundary swept by inert relatively condensible sweep gas and thus effecting separation of additional quantities of said component from said residual gas.

8. In a process wherein a feed gas flows past a face of a foraminous boundary within a separation zone and a relatively non-condensible component of said feed gas preferentially diffuses through said foraminous boundary and wherein the opposite face of said boundary is swept by an inert relatively condensible sweep gas, a portion of which diffuses into the feed gas, said feed gas and said sweep gas being at a temperature above the condensation point of the latter, the steps which comprise passing sweep gas countercurrently to the flow of feed gas through a plurality of such separation zones, condensing sweep gas from the residual feed gas discharged from each intermediate separation zone by reducing its temperature by indirect heat exchange to below the condensation point of the sweep gas, measuring the ratios of the flows of fresh feed gas to the plurality of separation zones and the residual gas from each separation zone substantially free of sweep gas, controlling the flow of said residual gas from each separation zone at a fixed proportion of the flow of fresh feed gas to the plurality of separation zones in response to said ratios of flows, and heating said residual gas to a temperature above the condensation point of the sweep gas intermediate each of said plurality of separation zones.

EARL V. HARLOW.

REFERENCES CITED

The following references are of record in the file of this patent:

UNITED STATES PATENTS

| Number | Name | Date |
|---|---|---|
| 2,255,069 | Maier | Sept. 9, 1941 |
| 2,497,898 | McGurl | Feb. 21, 1950 |
| 2,583,601 | Schwertz | Jan. 29, 1952 |

FOREIGN PATENTS

| Number | Country | Date |
|---|---|---|
| 266,396 | Great Britain | Feb. 23, 1927 |